United States Patent
Liao

(10) Patent No.: US 10,791,281 B1
(45) Date of Patent: Sep. 29, 2020

(54) IMAGE PROCESSING METHOD AND SYSTEM BASED ON ADJUSTMENTS PERFORMED ACCORDING TO ENVIRONMENT

(71) Applicant: GETAC TECHNOLOGY CORPORATION, Hsinchu County (TW)

(72) Inventor: Wu-Chieh Liao, Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 0 days.

(21) Appl. No.: 16/365,584

(22) Filed: Mar. 26, 2019

(51) Int. Cl.
  *H04N 5/232* (2006.01)
  *H04N 5/235* (2006.01)

(52) U.S. Cl.
  CPC ......... *H04N 5/2354* (2013.01); *H04N 5/2353* (2013.01); *H04N 5/23229* (2013.01)

(58) Field of Classification Search
  CPC .................................. H04N 5/23229
  USPC .................................. 348/254, 255
  See application file for complete search history.

(56) References Cited

U.S. PATENT DOCUMENTS

| | | | | |
|---|---|---|---|---|
| 5,345,313 | A | * 9/1994 | Blank | H04N 1/3873 348/584 |
| 2007/0092154 | A1 | * 4/2007 | Kato | H04N 5/23245 382/254 |
| 2009/0160938 | A1 | * 6/2009 | Chen | H04N 5/23229 348/148 |
| 2010/0073510 | A1 | * 3/2010 | Nemoto | H04N 9/69 348/223.1 |
| 2013/0308009 | A1 | * 11/2013 | Yoshida | H04N 5/243 348/223.1 |
| 2014/0028872 | A1 | * 1/2014 | Lee | H04N 5/2353 348/229.1 |
| 2016/0093243 | A1 | * 3/2016 | Su | G09G 3/2003 345/690 |
| 2017/0163852 | A1 | * 6/2017 | Li | H04N 5/202 |
| 2018/0124305 | A1 | * 5/2018 | Kobayashi | H04N 5/23293 |
| 2018/0205879 | A1 | * 7/2018 | Imai | H04N 5/23293 |
| 2018/0270400 | A1 | * 9/2018 | Koh | G06T 5/008 |

* cited by examiner

*Primary Examiner* — Anthony J Daniels

(57) ABSTRACT

An image processing method based on adjustments performed according to environment includes capturing an environmental parameter of an image, determining a scene mode of the image according to the environmental parameter, estimating a brightness correction parameter of the image according to the scene mode, and performing an image area determination to obtain an image area and an area brightness of the image area, followed by performing brightness correction on the image according to the image area, the area brightness and the brightness correction parameter, so as to ensure image quality. An image processing system based on adjustments performed according to environment is further provided.

13 Claims, 5 Drawing Sheets

IMAGE PROCESSING METHOD AND SYSTEM BASED ON ADJUSTMENTS PERFORMED ACCORDING TO ENVIRONMENT

BACKGROUND OF THE INVENTION

Field of the Invention

The present disclosure relates to image processing technology and, more particularly, to an image processing method and system based on adjustments performed according to environment.

Description of the Prior Art

A dashcam of a moving car records the car's location, condition, related data and captures a video of the surroundings. Therefore, the dashcam can provide video evidence in the event of a road accident.

The conventional dashcam has an image-capturing device. To capture an image, the image-capturing device adjusts shutter speed and ISO sensitivity (ISO value) automatically with an automatic exposure unit such that the image has invariable brightness. However, the aforesaid way of recording an image with invariable brightness has a drawback: during nighttime, the car in the image obtained looks sharp, but the background in the image obtained is blurred and dim, thereby failing to ensure overall image quality.

SUMMARY OF THE INVENTION

In view of the aforesaid drawback of the prior art, it is an objective of the present disclosure to provide an image processing method and system based on adjustments performed according to environment, so as to ensure image quality adaptively.

In an embodiment, an image processing method based on adjustments performed according to environment includes: capturing an environmental parameter of an image; determining a scene mode of the image according to the environmental parameter; estimating a brightness correction parameter of the image according to the scene mode; and performing an image area determination to obtain an image area and an area brightness of the image area, followed by performing brightness correction on the image according to the image area, the area brightness and the brightness correction parameter.

In some embodiments, the brightness correction involves performing gamma correction on background in the image when the scene mode is a dark mode.

In an embodiment, an image processing system based on adjustments performed according to environment includes an image-capturing unit, a scene determining unit, an image area determination unit and an image correction unit. The image-capturing unit captures at least an image and obtains an environmental parameter of the image. The scene determining unit and the image area determination unit are in signal connection with the image-capturing unit. The scene determining unit determines a scene mode of the image according to the environmental parameter and generates a brightness correction parameter according to the scene mode. The image area determination unit performs an image area determination on the image to obtain an image area and an area brightness of the image area. The image correction unit is in signal connection with the scene determining unit and the image area determination unit to perform brightness correction on the image according to the image area, the area brightness and the brightness correction parameter.

In some embodiments, when the scene determining unit determines the scene mode of the image to be a dark mode, the brightness correction involves performing gamma correction on background in the image.

In conclusion, a captured image varies with a variable environment. Therefore, the present disclosure is advantageous in that image processing is carried out to an image according to environment to perform brightness correction on each image appropriately, so as to ensure image quality.

DETAILED DESCRIPTION OF THE EMBODIMENTS

Figure 1:
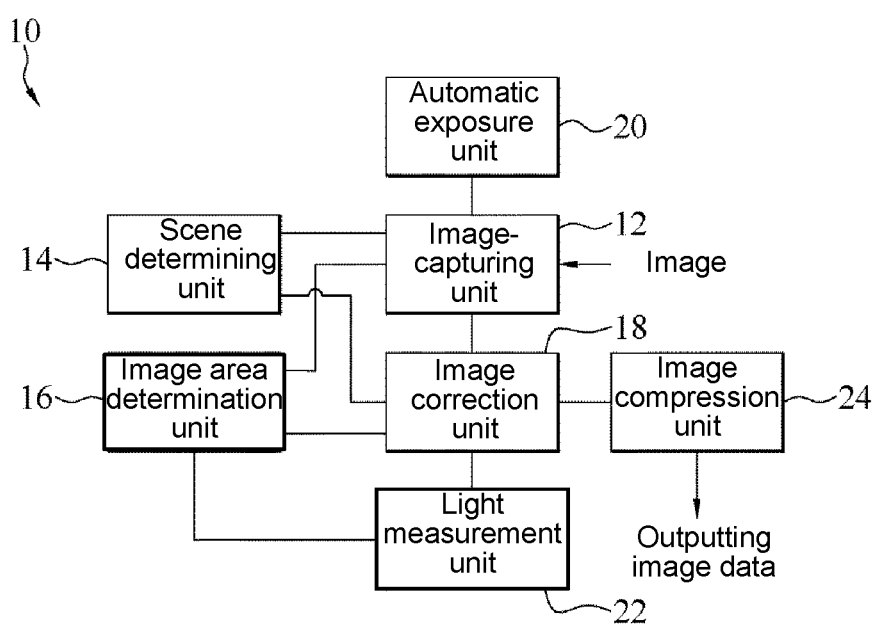
FIG. 1 is a schematic view of an image processing system according to an embodiment of the present disclosure.

FIG. 1 is a schematic view of an image processing system according to an embodiment of the present disclosure. Referring to FIG. 1, the image processing system 10, which is based on adjustments performed according to environment, includes an image-capturing unit 12, a scene determining unit 14, an image area determination unit 16, an image correction unit 18 and an automatic exposure unit 20.

The image-capturing unit 12 captures at least an image from outside and obtains an environmental parameter of the image. The automatic exposure unit 20 is in signal connection with the image-capturing unit 12. The automatic exposure unit 20 performs automatic exposure on the image-capturing environment to enable the image-capturing unit 12 to capture the image in the presence of supplemental light provided by the automatic exposure unit 20 and provide the environmental parameter to the image-capturing unit 12. In some embodiments, the image-capturing unit 12 is an image sensing component, such as a charge coupled device (CCD) or a complementary metal-oxide-semiconductor (CMOS).

In some embodiments, the environmental parameter is a shutter speed and an ISO sensitivity for use in obtaining the image, that is, the actual values obtained as a result of automatic exposure performed by the automatic exposure unit 20 on the image-capturing environment at the moment when the image-capturing unit 12 obtains the image.

The scene determining unit 14 is in signal connection with the image-capturing unit 12 to determine, according to the environmental parameter, a scene mode which the image is attributed to, and generate a brightness correction parameter according to the scene mode. In an embodiment, the brightness correction parameter is a gamma correction value for restoring image brightness. The image area determination unit 16 is in signal connection with the image-capturing unit 12. The image area determination unit 16 performs an image area determination on the captured image to obtain an image area and an area brightness of the image area. The image correction unit 18 is in signal connection with the scene determining unit 14 and the image area determination unit 16 such that the image correction unit 18 can perform brightness correction on the image according to the obtained image area, area brightness and brightness correction parameter. Therefore, the brightness of the image is restored to be proportionate to that of the real scene and perceivable by the naked eye. In some embodiments, the area brightness is the average brightness of the image area obtained by the image area determination unit 16, and the image area is the whole area of the image or a partial area of the image.

In some embodiments, the image correction unit 18 is an image signal processing chip (ISP).

The image processing system 10 further has a light measurement unit 22 in signal connection with the image area determination unit 16 and the image correction unit 18. When the image area determination unit 16 provides the location and magnitude of the image area to the light measurement unit 22, the light measurement unit 22 performs light measurement on the image area such that the image area is subjected to optimal exposure, so as to estimate brightness of the current frame according to the image area and thereby ensure optimal area brightness.

In some embodiments, after being completely corrected by the image correction unit 18, the image is compressed by an image compression unit 24 to become image data. Then, the image data is output to a storage unit or an external device for back-end storage.

Figure 2:
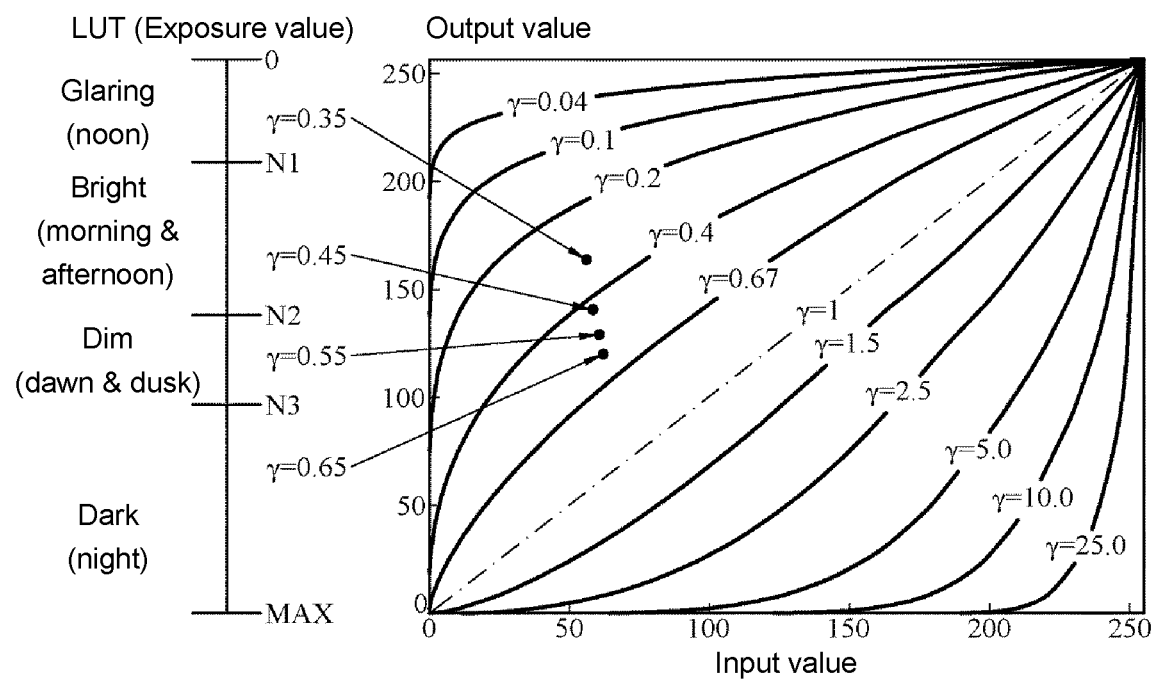
FIG. 2 is a schematic view of a scene mode divided into four sectors according to a gamma value according to an embodiment of the present disclosure.

In some embodiments, different scene modes are determined according to the environmental parameter, i.e., the shutter speed and the ISO sensitivity. Since the shutter speed and the ISO sensitivity are directly proportional to the exposure value, and the exposure value and an alpha ($\alpha$) value are directly proportional to a gamma ($\gamma$) value, the alpha value is a conversion variable for correlating the exposure value with the gamma value. Therefore, a look up table (LUT) is created by each exposure value corresponds to the gamma value. Expressions are shown as below.

shutter speed (second)×ISO sensitivity=exposure value exposure value×alpha value=gamma value or LUT (exposure value)=gamma value According to the expressions, the gamma value can be inferred from the shutter speed and the ISO sensitivity (or the LUT), such that a scene mode of the image is determined according to the shutter speed and the ISO sensitivity (or the LUT), and then to determine the gamma value. Referring to FIG. 2, the scene mode is divided into four sectors according to the LUT and the corresponding gamma value. However, the present disclosure is not restrictive of the number of the sectors. In practice, the more the sectors are, the better the efficacy is. To increase the number of the sectors, the number of the sectors can be adjusted according to a user or system. In this embodiment, the four sectors are, from low to high gamma values, glaring mode (gamma=0.35, noon), bright mode (gamma=0.45, morning and afternoon), dim mode (gamma=0.55, dawn and dusk), and dark mode (gamma=0.65, night). The dark mode occurs at night or any other circumstances where there is a lack of illumination (gamma≥0.65).

When the scene determining unit 14 determines the scene mode of the image to be the dark mode, the image correction unit 18 performs brightness correction by performing gamma correction on the background in the image rather than the image area in the image, so as to restore background brightness. In an embodiment, when the scene mode is determined to be the dark mode, the image area is determined to be a partial area, wherein the background in the image is outside the image area in the image, causing the image area determination unit 16 to obtain the image area and the area brightness of the image area, further causing the image correction unit 18 to perform brightness correction on the background in the image rather than the image area in the image according to the image area, the area brightness, and the brightness correction parameter, allowing the brightness surrounding the image area in the image to equal the brightness within the image area in the image. Therefore, the brightness of the whole image is restored to the brightness of the real scene to thereby eliminate any difference in brightness between the image area and the background; otherwise, the background is blurred and dim.

In some embodiments, the image-capturing unit 12, the image correction unit 18, the automatic exposure unit 20, the light measurement unit 22, and the image compression unit 24 are built-in components of an image-capturing device, such as a camera or a camcorder. The scene determining unit 14 and the image area determination unit 16 are provided in a dashcam or an engine system of a car. In some further embodiments, the image-capturing unit 12, the scene determining unit 14, the image area determination unit 16, the image correction unit 18, the automatic exposure unit 20, the light measurement unit 22 and the image compression unit 24 are integrated into the same image-capturing device.

Figure 3:
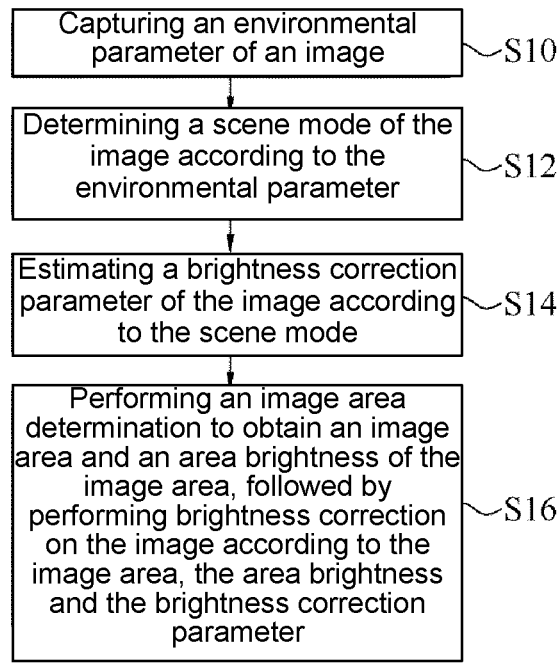
FIG. 3 is a schematic view of a process flow of an image processing method according to an embodiment of the present disclosure.

Referring to FIG. 1 through FIG. 3, the image processing method based on adjustments performed according to environment includes the steps of: capturing an environmental parameter of an image with an image-capturing unit 12 (step S10) and performing an automatic exposure process on the image with the automatic exposure unit 20 to obtain an environmental parameter of the image, such as shutter speed and ISO sensitivity; determining a scene mode of the image with the scene determining unit 14 according to the environmental parameter (step S12), wherein the scene mode is exemplified by a glaring mode, a bright mode, a dim mode, and a dark mode; estimating a brightness correction parameter of the image with the scene determining unit 14 according to the scene mode (step S14) to obtain a gamma correction value of each image; performing an image area determination with the image area determination unit 16 to obtain an image area of the image and an area brightness of the image area, followed by performing brightness correction on the image with the image correction unit 18 according to the image area, the area brightness and the brightness correction parameter (step S16). In an embodiment, in the step of obtaining the area brightness, the image area determination unit 16 operates in conjunction with the light measurement unit 22 to estimate the average brightness of the image area such that the estimated average brightness of the image area is regarded as the area brightness.

Figure 4:
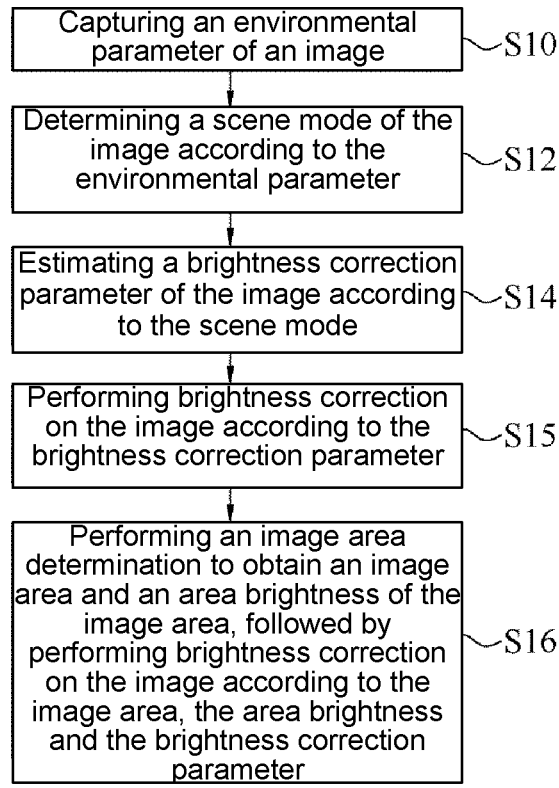
FIG. 4 is a schematic view of a process flow of the image processing method according to another embodiment of the present disclosure.

In some embodiments, as shown in FIG. 4, after the step of obtaining the brightness correction parameter (gamma correction value) of the image (step S14), the image correction unit 18 performs brightness correction on the image according to the brightness correction parameter (step S15)

such that the brightness of the image is restored to be proportionate to that of the real scene and perceivable by the naked eye. Afterward, the step of image area determination is performed (step S16). The other steps are the same as those of the method in the embodiment illustrated by FIG. 3 and thus, for the sake of brevity, are not reiterated.

Figure 5:
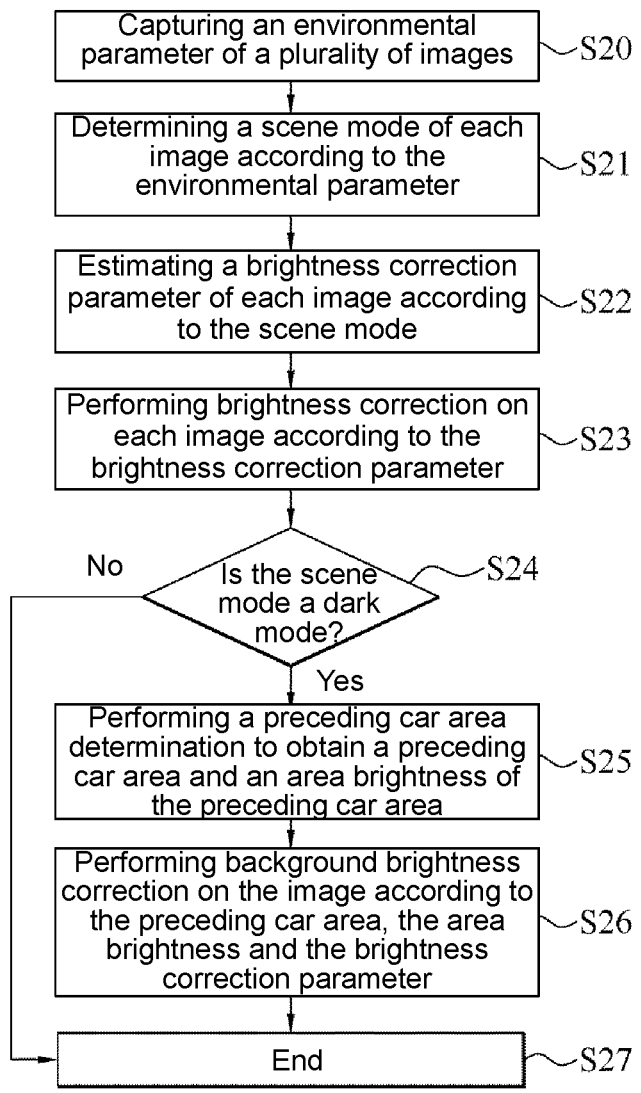
FIG. 5 is a schematic view of a process flow of the image processing method according to yet another embodiment of the present disclosure.

In some embodiments, to clarify the complete process flow of the image processing method, the image area is configured to be a partial area where a preceding car is present and is known as preceding car area. The following embodiment is exemplified by the preceding car area and described in detail. Referring to FIG. 1, FIG. 2 and FIG. 5, the image processing method including the steps of capturing an environmental parameter of a plurality of images (step S20), capturing the images sequentially with the image-capturing unit 12, and performing an automatic exposure process on each image with the automatic exposure unit 20 to obtain the environmental parameter of the images, such as shutter speed and ISO sensitivity. The scene determining unit 14 determines the scene mode of the images according to the environmental parameter (step S21). For instance, the scene mode is a glaring mode (which occurs at noon), a bright mode (which occurs in the morning and afternoon), a dim mode (which occurs at dawn and dusk), or a dark mode (which occurs at night), but the present disclosure is not limited thereto. Whatever the scene mode, the scene determining unit 14 always estimates the brightness correction parameter of each image according to the scene mode (step S22) to obtain the gamma correction value of each image. After the brightness correction parameter of each image has been obtained, the image correction unit 18 performs brightness correction on the whole frame of each image according to the brightness correction parameter (step S23) such that the brightness of an image is restored to be proportionate to that of the real scene and perceivable by the naked eye. Since the scene mode of each image is determined in step S21, step S24 involves determining whether an image is attributed to the dark mode. In step S24, a negative determination causes termination of the process flow the correction processing of the image (step S27), whereas an affirmative determination causes the image area determination unit 16 to perform a preceding car area determination (step S25) and thereby obtain a preceding car area in the image and an area brightness of the preceding car area, wherein the area brightness is the average brightness of the preceding car area and can be obtained by the light measurement unit 22. Afterward, the image correction unit 18 performs background brightness correction on the image according to the preceding car area, area brightness and brightness correction parameter (step S26), that is, performs gamma correction on the background area such that the brightness surrounding the preceding car area in the image equals the brightness within the preceding car area in the image, allowing the brightness of the image to be restored to be proportionate to that of the real scene and thereby precluding any difference in brightness between the preceding car area and the background (the brightness difference renders the car image sharp and the background image blurred). Upon completion of the step of background brightness correction performed on each image in the dark mode, the process flow of the correction processing of the image terminates (step S27).

Figure 6:
FIG. 6 is a graph of gamma correction according to an embodiment of the present disclosure.
Figure 7:
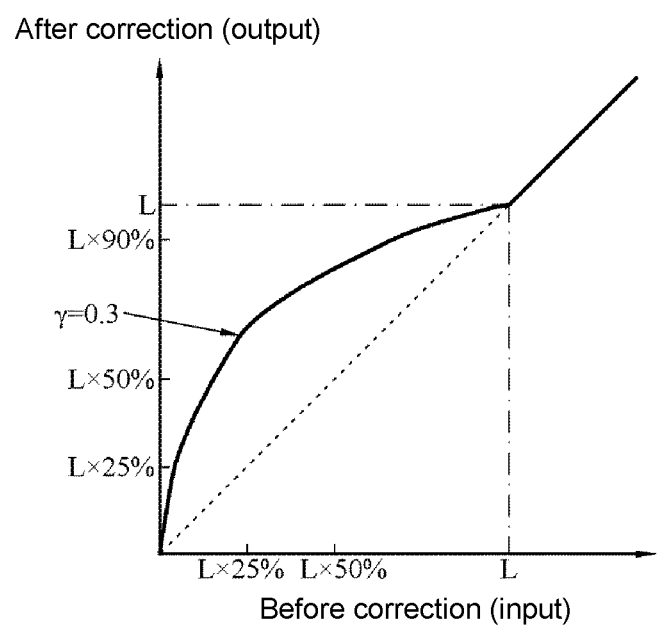
FIG. 7 is a graph of gamma correction according to another embodiment of the present disclosure.

In some embodiments, when the image is determined to be attributed to the dark mode, brightness correction involves performing gamma correction on the background in the image (to correct the brightness surrounding the preceding car area in the image.) Referring to FIG. 6, the dashed line denotes pre-adjustment background brightness, whereas the solid line denotes post-adjustment background brightness, with the preceding car area brightness L functioning as a standard, the brightness of the input image is adjusted according to a brightness ratio, for example, increasing 25% brightness to 50% brightness, increasing 50% brightness to 90% brightness, so as to perform gamma correction according to the ratio. Referring to FIG. 7, the dashed line denotes pre-adjustment background brightness, whereas the solid line denotes post-adjustment background brightness, with the preceding car area brightness L functioning as a standard, the brightness of the input image is increased according to the gamma curve (gamma value γ=0.3), so as to perform gamma correction according to the gamma value, thereby adjusting the background brightness. In an embodiment, the gamma value is a predetermined parameter, for example, a parameter predetermined according to measurement performed before installation.

Therefore, a captured image varies with a variable environment. For instance, when the image processing method and system of the present disclosure are applied to a dashcam, the environment of the captured image changes while the car is moving. Therefore, the present disclosure is advantageous in that image processing is carried out to an image according to environment to perform brightness correction on each image appropriately and thereby enhance image quality, so as to ensure image quality adaptively. Furthermore, when applied to special use, the image processing system of the present disclosure ensures optimal efficacy. For instance, when applied to a dashcam mounted on a police car, the image processing system of the present disclosure ensures that all the captured images are sharp and the backgrounds are not blurred or dim such that the dashcam mounted on the police car can provide video evidence in the event of a road accident.

The features and advantages of the present disclosure are illustrated by the embodiments of the present disclosure to enable persons skilled in the art to gain insight into the technical disclosure in the present disclosure and implement the present disclosure accordingly. The embodiments of the present disclosure are not restrictive of the claims of the present disclosure. Equivalent changes or modifications made to the embodiments of the present disclosure in accordance with the spirit embodied in the present disclosure must be deemed falling within the scope of the present disclosure.

What is claimed is:

1. An image processing method based on adjustments performed according to environment, comprising the steps of:
   capturing an environmental parameter of an image;
   determining a scene mode of the image according to the environmental parameter;
   estimating a first brightness correction parameter of the image according to the scene mode;
   performing a first brightness correction on the image as a whole according to the first brightness correction parameter; and
   when the scene mode is a dark mode, performing the steps of:
      performing an image area determination on the image to obtain an image area, a background area, and an area brightness of the image area; and
      performing a second brightness correction on the image according to the image area, the area brightness of the image area and a second brightness correction parameter, wherein the second brightness correction comprises performing gamma correction on the background area but not the image area when the scene mode is a dark mode;
wherein the image as a whole comprises the image area and the background area.

2. The image processing method based on adjustments performed according to environment according to claim 1, wherein the step of obtaining the area brightness involves estimating an average brightness of the image area such that the estimated average brightness of the image area is regarded as the area brightness.

3. The image processing method based on adjustments performed according to environment according to claim 1, wherein the image undergoes an automatic exposure process to obtain the environmental parameter.

4. The image processing method based on adjustments performed according to environment according to claim 3, wherein the environmental parameter is a shutter speed and an ISO sensitivity for use in obtaining the image.

5. The image processing method based on adjustments performed according to environment according to claim 1, wherein the first brightness correction parameter is a gamma correction value for restoring the image brightness.

6. The image processing method based on adjustments performed according to environment according to claim 1, wherein, in the step of estimating the first brightness correction parameter of the image, brightness of the image is restored to be proportionate to brightness of a real scene and perceivable by a naked eye.

7. The image processing method based on adjustments performed according to environment according to claim 1, wherein the background area is an entire remainder of the image outside the image area.

8. An image processing system based on adjustments performed according to environment, comprising:
an image-capturing unit for capturing at least an image and obtaining an environmental parameter of the image;
a scene determining unit being in signal connection with the image-capturing unit, determining a scene mode of the image according to the environmental parameter, and generating a first brightness correction parameter according to the scene mode;
an image area determination unit being in signal connection with the image-capturing unit and performing an image area determination on the image to obtain an image area, a background area, and an area brightness of the image area; and
an image correction unit being in signal connection with the scene determining unit and the image area determination unit, configured to perform the steps of:
perform a first brightness correction on the image as a whole according to the first brightness correction parameter; and
when the scene mode is a dark mode, perform the steps of:
performing a second brightness correction on the image according to the image area, the area brightness of the image area and a second brightness correction parameter, wherein the second brightness correction comprises performing gamma correction on the background area but not the image area when the scene mode is a dark mode, wherein the second brightness correction comprises performing gamma correction on the background area but not the image area;
wherein the image as a whole comprises the image area and the background area.

9. The image processing system based on adjustments performed according to environment according to claim 8, wherein the area brightness is an average brightness of the image area.

10. The image processing system based on adjustments performed according to environment according to claim 8, further comprising an automatic exposure unit for performing automatic exposure on a capturing environment of the image to enable the image-capturing unit to capture the image in presence of supplemental light provided by the automatic exposure unit and provide the environmental parameter to the image-capturing unit.

11. The image processing system based on adjustments performed according to environment according to claim 10, wherein the environmental parameter is a shutter speed and an ISO sensitivity for use in obtaining the image.

12. The image processing system based on adjustments performed according to environment according to claim 8, wherein the first brightness correction parameter is a gamma correction value for restoring the image brightness.

13. The image processing system based on adjustments performed according to environment according to claim 8, wherein the background area is an entire remainder of the image outside the image area.

* * * * *